United States Patent
Hao et al.

(10) Patent No.: US 11,075,519 B2
(45) Date of Patent: Jul. 27, 2021

(54) BIDIRECTIONAL CAPACITOR BANK CONTROL

(71) Applicant: Schweitzer Engineering Laboratories, Inc., Pullman, WA (US)

(72) Inventors: Kei Hao, Anaheim, CA (US); Jeremy William Blair, Jackson, MS (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/668,935

(22) Filed: Oct. 30, 2019

(65) Prior Publication Data

US 2021/0109558 A1     Apr. 15, 2021

Related U.S. Application Data (60) Provisional application No. 62/913,983, filed on Oct. 11, 2019.

(51) Int. Cl.
*H02J 3/18* (2006.01)
*H01G 4/38* (2006.01)
*G05F 1/70* (2006.01)

(52) U.S. Cl.
CPC ............. *H02J 3/1821* (2013.01); *G05F 1/70* (2013.01); *H01G 4/38* (2013.01)

(58) Field of Classification Search
CPC .................................................. H02J 3/18–22
See application file for complete search history.

(56) References Cited

U.S. PATENT DOCUMENTS

| | | | |
|---|---|---|---|
| 7,521,825 B2* | 4/2009 | Lasseter | H02J 3/38 307/130 |
| 9,250,282 B2 | 2/2016 | Ukil et al. | |
| 9,366,715 B2 | 6/2016 | Ukil et al. | |
| 2003/0099070 A1 | 5/2003 | Macbeth | |
| 2007/0226602 A1 | 9/2007 | Kirmser | |
| 2013/0141827 A1 | 6/2013 | Ukil et al. | |
| 2013/0221977 A1 | 8/2013 | Ukil et al. | |
| 2014/0158665 A1* | 6/2014 | McCord | H01H 33/168 218/143 |
| 2014/0200843 A1 | 7/2014 | Shamir | |

(Continued)

OTHER PUBLICATIONS

R. Mihalic, P. Zunko and D. Povh, "Improvement of transient stability using unified power flow controller," in IEEE Transactions on Power Delivery, vol. 11, No. 1, pp. 485-492, Jan. 1996. (Year: 1996).*

(Continued)

*Primary Examiner* — Peter M Novak
(74) *Attorney, Agent, or Firm* — Bradley W. Schield (57) ABSTRACT

Systems and methods to control a capacitor bank based on the power flow direction are described herein. For example, a capacitor bank controller (CBC) may determine a power flow direction based on one or more current measurements and one or more voltage measurements. The CBC may control the capacitor bank using a first quantity when the power flow direction is in a first direction. The CBC may control the capacitor bank using a second quantity when the power flow direction is in a second direction. The second quantity may be different from the first quantity to account for the relationship between sensors of the CBC with respect to the capacitor bank on the power line.

18 Claims, 6 Drawing Sheets

(56) References Cited

U.S. PATENT DOCUMENTS

| | | |
|---|---|---|
| 2015/0293164 A1 | 10/2015 | Stephenson |
| 2015/0309105 A1 | 10/2015 | Ostrovsky |
| 2016/0187409 A1 | 6/2016 | Kolker |
| 2016/0187410 A1 | 6/2016 | Kolker |
| 2016/0202321 A1 | 7/2016 | Drame |
| 2016/0245850 A1 | 8/2016 | Kasztenny |
| 2018/0292447 A1 | 10/2018 | Piyasinghe |
| 2019/0037515 A1 | 1/2019 | Shamir |
| 2019/0123668 A1 | 4/2019 | Da Costa |
| 2019/0331722 A1 | 10/2019 | Hao |
| 2020/0166557 A1* | 5/2020 | Verma ............... H02H 3/16 |

OTHER PUBLICATIONS

IntelliCap® 2000 Automatic Capacitor Control Instruction Sheet 1024-540, S&C Electric Company, Aug. 2019.

Ukil, Abhisek, et al., "Current-Only Directional Overcurrent Relay". IEEE Sensors Journal, Nov. 22, 2010, vol. 11, Issue 6.

Ukil, Abhisek, et al., "Current-Only Directional Overcurrent Protection for Distribution Automation: Challenges and Solutions". IEEE Transactions on Smart Grid, Aug. 22, 2012, vol. 3, Issue 4.

\* cited by examiner

BIDIRECTIONAL CAPACITOR BANK CONTROL

RELATED APPLICATION

This application claims priority under 35 U.S.C. § 119 to U.S. Provisional Patent Application No. 62/913,983 filed on Oct. 11, 2019, titled "BIDIRECTIONAL CAPACITOR BANK CONTROL," which application is hereby incorporated by reference in its entirety.

TECHNICAL FIELD

The present disclosure relates generally to capacitor bank controllers in electric power systems and, more particularly, to controlling a capacitor bank based on the direction of power flow.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, and transformers, to provide electrical energy from sources to loads. Various intelligent electronic devices (IEDs) may be used in monitoring and control of the power delivery system. For example, capacitor bank controllers (CBCs) may control capacitor banks in the power delivery system to control reactive power demand. Depending on the voltage and current on the power line, the CBC may perform control operations by sending signal(s) to connect or disconnect the capacitor bank to provide for power factor correction, volt-ampere reactive (VAR) support, and/or voltage improvement. For example, if increased inductive loads are connected to the power system, the CBC may electrically connect the capacitor bank to the power system to offset the reactive power demand of those loads and thus improve the power factor of the power system.

Over time, power systems have become more bidirectional rather than radial. That is, power flow may occur in either direction on a power line depending on operating conditions. If power flow changes direction (i.e., where the source and load are swapped), the CBC may be limited controlling the capacitor bank based on voltages because the current sensor measurements may be affected by the power flow direction. For example, a current sensor may be installed upstream of a capacitor bank when power flows from a particular power source. If the power flow changes direction, the current sensor would then be downstream of the capacitor bank and no longer able to measure the effect of the capacitor bank on the reactive demand of the feeder.

As described below, a CBC may perform control operations of a capacitor bank based on the direction of power flow on the power line. For example, the CBC may include one or more sensors configured to obtain one or more current measurements and one or more voltage measurements of a power line. The CBC may include a processor that executes instructions on memory to determine a power flow direction based at least in part on the one or more current measurements and the one or more voltage measurements. The processor may be programmed to control the capacitor bank based on a first quantity when the power flow direction is in a first direction and to control the capacitor bank based on a second quantity when the power flow direction is in a second direction, opposite the first direction. The second quantity may be different from the first quantity to account for a relationship between the one or more sensors of the CBC with respect to the capacitor bank on the power line (e.g., upstream or downstream of the capacitor bank).

Figure 1:
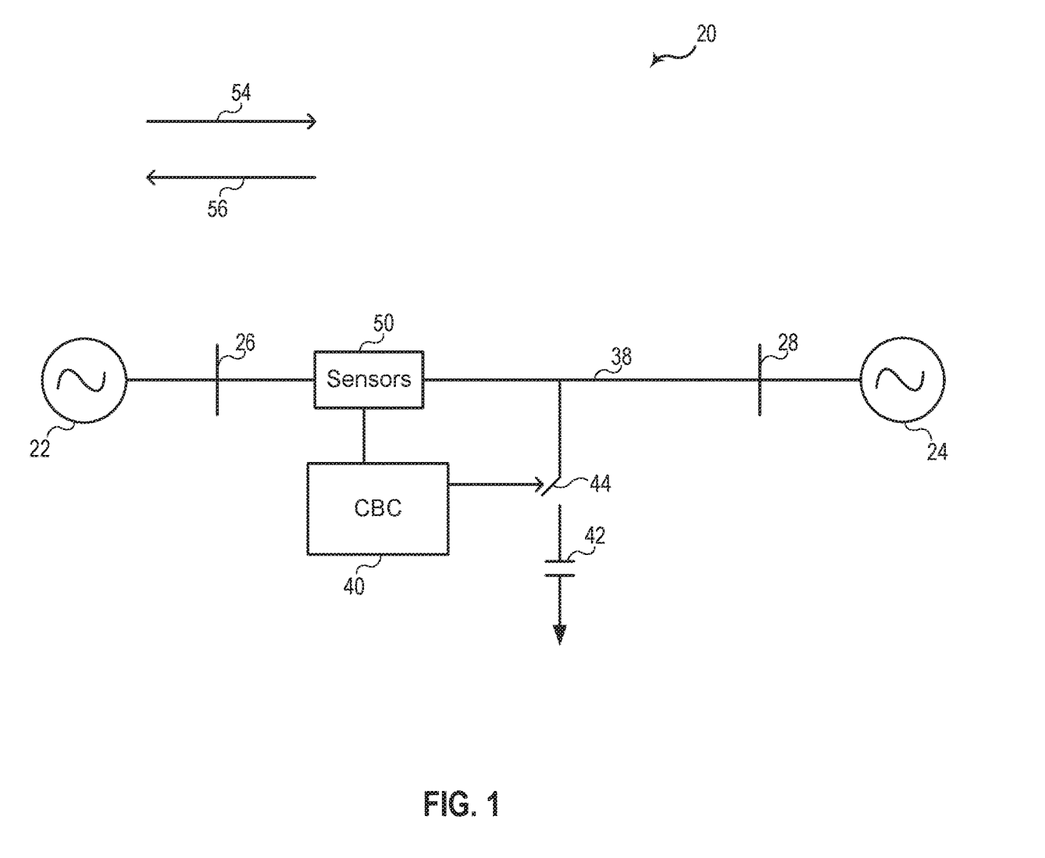
FIG. 1 is a one-line diagram of an electric power delivery system having a capacitor bank controller (CBC) that uses different calculations in controlling a capacitor bank depending on the power flow direction, in accordance with an embodiment.

FIG. 1 illustrates a one-line diagram of an embodiment of an electric power delivery system 20, which may have various electric transmission lines, electric distribution lines, current transformers, buses, switches, circuit breakers, reclosers, transformers, autotransformers, tap changers, voltage regulators, capacitor banks, generators, motors, pumps, compressors, valves, and a variety of other types of monitored equipment. For illustrative purposes, the electric power delivery system 20 includes a first power source 22 and a second power source 24 and buses 26 and 28. The buses 26 and 28 may include one or more loads that consume power from the first power source 22 and the second power source 24. The electric power delivery system 20 includes a power line 38 that is communicatively coupled between the first power source 22 and the second power source 24 to deliver power from the power sources 22 and 24, to the loads on the buses 26 and 28. Although illustrated in single-line form for purposes of simplicity, the electric power delivery system 20 may be part of a larger multi-phase system, such as a three-phase electric power delivery system.

The electric power delivery system 20 may be monitored by a capacitor bank controller (CBC) 40 that controls a capacitor bank 42 by sending signals to a switching device 44 of the capacitor bank 42 to electrically connect or disconnect the capacitor bank 42 from the power line 38. While illustrated as a single capacitor, note that several capacitors may be used and the particular size of the capacitor bank may depend on the application. For a multi-phase system, a set of capacitor banks may be connected to each of the phases.

The CBC 40 may obtain electric power system information using one or more sensors 50, such as current transformers (CTs), potential transformers (PTs), line post sensors, wireless current sensors and the like. The one or more sensors 50 may provide signal(s) indicating current and voltage on the power line 38. For example, CTs and PTs may provide current and voltage signals proportional to the current and voltage on the power line 38. Alternatively and/or additionally, wireless current sensors may provide current magnitude and phase measurements to the CBC 40. These current measurements and voltage measurements may be used to control operation of the switching device 44.

Power flows from a source to a load. As illustrated, power may flow in a first power flow direction 54 at a first time from the first power source 22 to loads of the buses 26 and 28. Depending on the direction of power flow, the one or more sensors 50 may detect different current characteristics of the power line 38. For example, if a current sensor is upstream of the capacitor bank, as illustrated with power flowing in the first power flow direction 54, the current sensor may detect current flowing to the capacitor bank and loads on the power line 38. If the current sensor is downstream of the capacitor bank, as illustrated with power flowing in the second power flow direction 56, the current sensor may detect current flowing to loads on the power line Stated another way, when a current sensor of the one or more sensors 50 are on the source side of the capacitor bank (with power flowing in the first power flow direction 54) and the capacitor bank 42 is disconnected, the current sensor detects currents to the loads on bus 28. When the capacitor bank is connected, the current sensor detects currents to the aggregate load of the capacitor bank and the loads on bus 28. If the capacitor bank is of appreciable size relative to the loads on bus 28, the CBC 40 may detect, from the currents of the current sensor, changes in VAR and power factor, and perhaps some changes in voltage level. Any subsequent decision by the CBC 40 to disconnect the capacitor bank is determined based on measurements including the same aggregate load (from the capacitor bank and the loads on bus 28).

However, if the current sensor is on the load side of the capacitor bank (with power flowing in the second power flow direction 56), when the capacitor bank is disconnected, the current sensor detects current to the loads on bus 26. When the capacitor bank is connected, the current sensor still just detects current to the loads on bus 26. Even if the capacitor bank is of appreciable size, the CBC 40 may detect, from the currents of the current sensor, no change in VAR and power factor due to the load remaining the same, and perhaps may detect some change in voltage level. That is, subsequent decisions to control the capacitor bank are made based on the same load that does not include the capacitor bank. As explained below, different control quantities may be used depending on the power flow direction to account for the relationship between the sensors and the capacitor bank.

Figure 2:
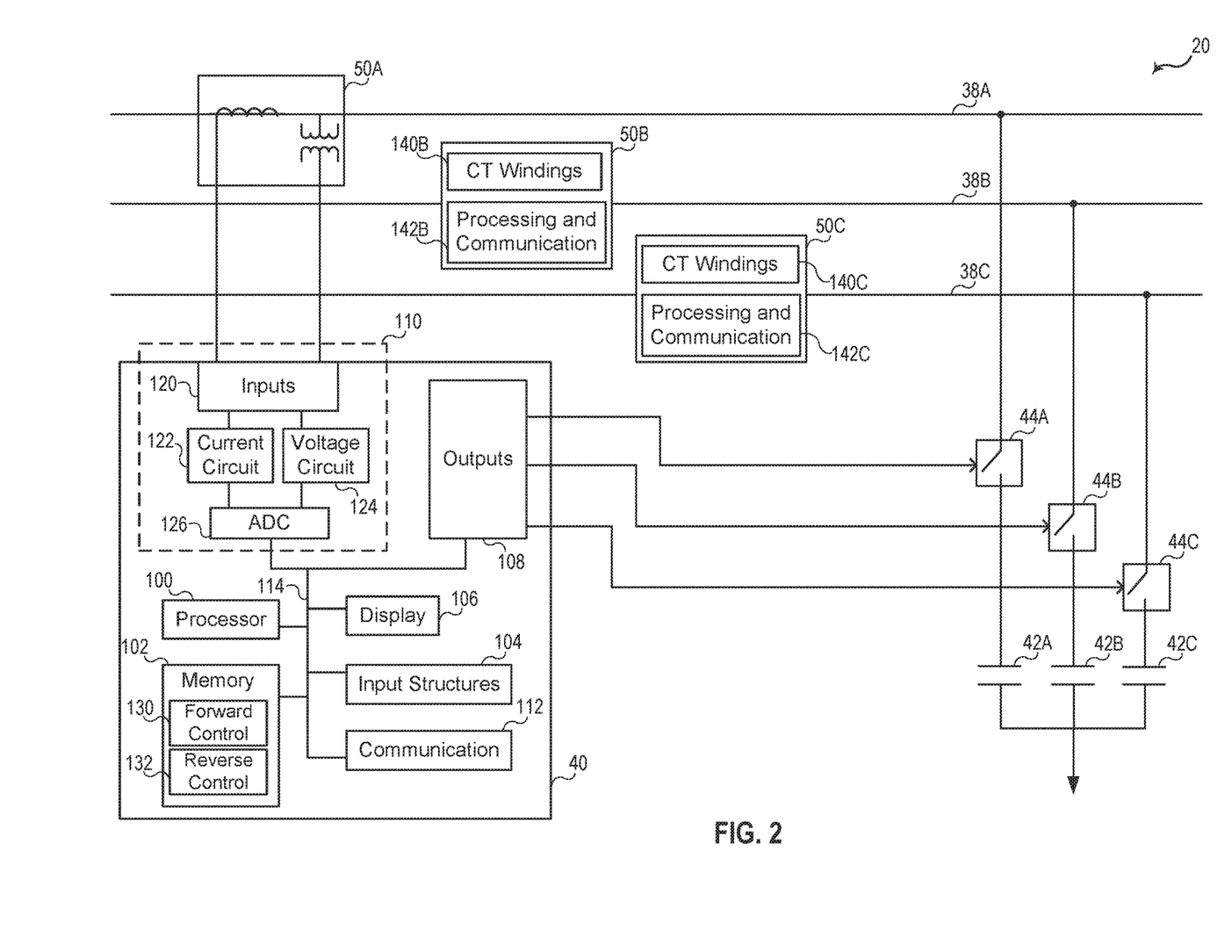
FIG. 2 is a block diagram of the CBC of FIG. 1, in accordance with an embodiment.

FIG. 2 is a block diagram of the CBC 40 in a three phase electric power delivery system. The CBC 40 may communicate with the switching device(s) 44A-C, a combination line post sensor 50A, and wireless current sensors 50B and 50C. The CBC 40 may be communicatively coupled to a CT and PT of the combination line post sensor 50A to receive signal(s) indicating current measurements and/or voltage measurements of the power line 38. Further, the CBC 40 may be communicatively coupled to the switching device(s) 44A-C to send signal(s) to the switching device(s) 44A-C to electrically connect the capacitor bank 42A-C to or disconnect the capacitor bank 42A-C from the power line 38A-C. The switching device 44 may be any suitable switching device or combination of devices that connect or disconnect the capacitor bank 42, such as metal-oxide-semiconductor field-effect transistors (MOSFETs), relays, switches, etc. While the switching devices 44A-C are illustrated as individual switching devices that independently may control each phase, in other embodiments, the switching device 44 may be a ganged switching device that connects or disconnects the three phases of the capacitor bank 42A-C together.

In the illustrated embodiment, the CBC 40 includes a processor 100, a computer-readable storage medium 102, input structures 104, a display 106, output circuitry 108, sensor circuitry 110, and communication circuitry 112. The CBC 40 may include one or more bus(es) 114 connecting the processor 100 or processing unit(s) to the computer-readable storage medium 102, the input structures 104, the display 106, the output circuitry 108, the sensor circuitry 110, and/or the communication circuitry 112. The computer-readable storage medium 102 may be embodied as memory, such as random access memory (RAM), read only memory (ROM), or a combination thereof, and may include or interface with software, hardware, or firmware modules for implementing various portions of the systems and methods described herein. The computer-readable storage medium 102 may be the repository of one or more modules and/or executable instructions configured to implement any of the processes described herein.

The processor 100 may process inputs received via the sensor circuitry 110 and the communication circuitry 112. The processor 100 may operate using any number of processing rates and architectures. The processor 100 may be configured to perform various algorithms and calculations described herein using computer executable instructions stored on computer-readable storage medium 102. The processor 100 may be embodied as a microprocessor. In certain embodiments, the processor 100 and/or the computer-readable storage medium 102 may be embodied as discrete electrical components, a general purpose integrated circuit, one or more Application Specific Integrated Circuits ("ASICs"), a Field Programmable Gate Array ("FPGA"), and/or other programmable logic devices. The processor 100 and/or the computer-readable storage medium 102 may be referred to generally as processing circuitry.

As illustrated, the sensor circuitry 110 may include, for example, input pins 120 or connectors that receive voltage signal(s) and current signals(s) from a voltage sensor, a current sensor, or a combination sensor 50. The sensor circuitry 110 may transform the current and voltage signals using an internal current circuit 122 and an internal voltage circuit 124 to a level that may be measured (e.g., via internal transformers), and sample the signals using, for example, A/D converter(s) 126 to produce digital signals representative of measured voltage and measured current on the power line 38. The A/D converter 126 may be connected to the processor 100 by way of the bus 114, through which digitized representations of voltage signals may be transmitted to the processor 100. The processor 100 may use the voltage measurements and current measurements to perform control operations to control the switching device 44.

The communication circuitry 112 may include communication ports, such as ethernet and serial ports. In some embodiments, the CBC 40 may remotely control switches of the capacitor banks by communicating using the ethernet or serial ports. Further, the communication circuitry 112 may include a wireless transceiver to communicate with one or more electronic devices, such as the wireless current sensors 50B and 50C. The CBC 40 may include a display screen 106 that displays information to notify an operator of operating parameters of the electric power delivery system 20, such as current measurements, voltage measurements, capacitor bank status, power flow direction, etc. The input structures 104 may include buttons, controls, universal serial bus (USB) ports, or the like, to allow a user to provide input settings to the CBC 40. In some embodiments, the display 106 may be a touchscreen display.

As illustrated, in addition to one or more wired combination sensors 50A (e.g., wired CTs and/or wired PTs) that are electrically connected to inputs of the CBC 40, the CBC 40 may communicate with one or more wireless current sensors 50B and 50C. The wireless current sensor 50B and 50C may include current transformer windings 140B and 140C and processing and communication circuitry 142B and 142C. The current transformer windings 140B and 140C may detect current proportional to the current on the power line 38B and 38C to allow for monitoring of the power line 38B and 38C. The processing and communication circuitry 142B and 142C may include any suitable electrical components to communicate current measurements from the windings 140B and 140C to the CBC 40. For example, the processing and communication circuitry 142B and 142C may include a transceiver configured to send wireless signals to the transceiver of the CBC 40 to communicate current measurements of the power line 38B and 38C. The wireless current sensor may include power harvesting circuitry configured to harvest power from the power line to allow the wireless current sensor 50B and 50C to perform current measurements and to communicate with the CBC 40.

In the illustrated embodiment, the voltage measurements of phase A are determined using the wired combination sensor 50A. In some embodiments, additional voltages may be obtained using additional potential transformers on the B and C phases. Alternatively, phase B and C voltages may be estimated using the voltages from the A phase (e.g., offset by 120 degrees from the A phase voltage measurements). While these are given as examples, any suitable method for obtaining voltage and current measurements may be used.

In some embodiments, the wireless current sensor 50B and 50C may communicate zero-crossing information. For example, when current flow changes from positive to negative or negative to positive, the wireless current sensor 50B and 50C may send a signal indicating the time at which the zero-crossing occurred. Further, processor 100 may determine power flow direction based on the current measurements and the voltage measurements.

The output circuitry 108 may include one or more output pins or connectors that electrically connect the CBC 40 to each of the switching devices 44A-C to allow the processor 100 to send control signals to the switching devices 44A-C to control connection or disconnection of the phases of the capacitor bank 42A-C to the phases of the power line 38A-C.

Figure 3:
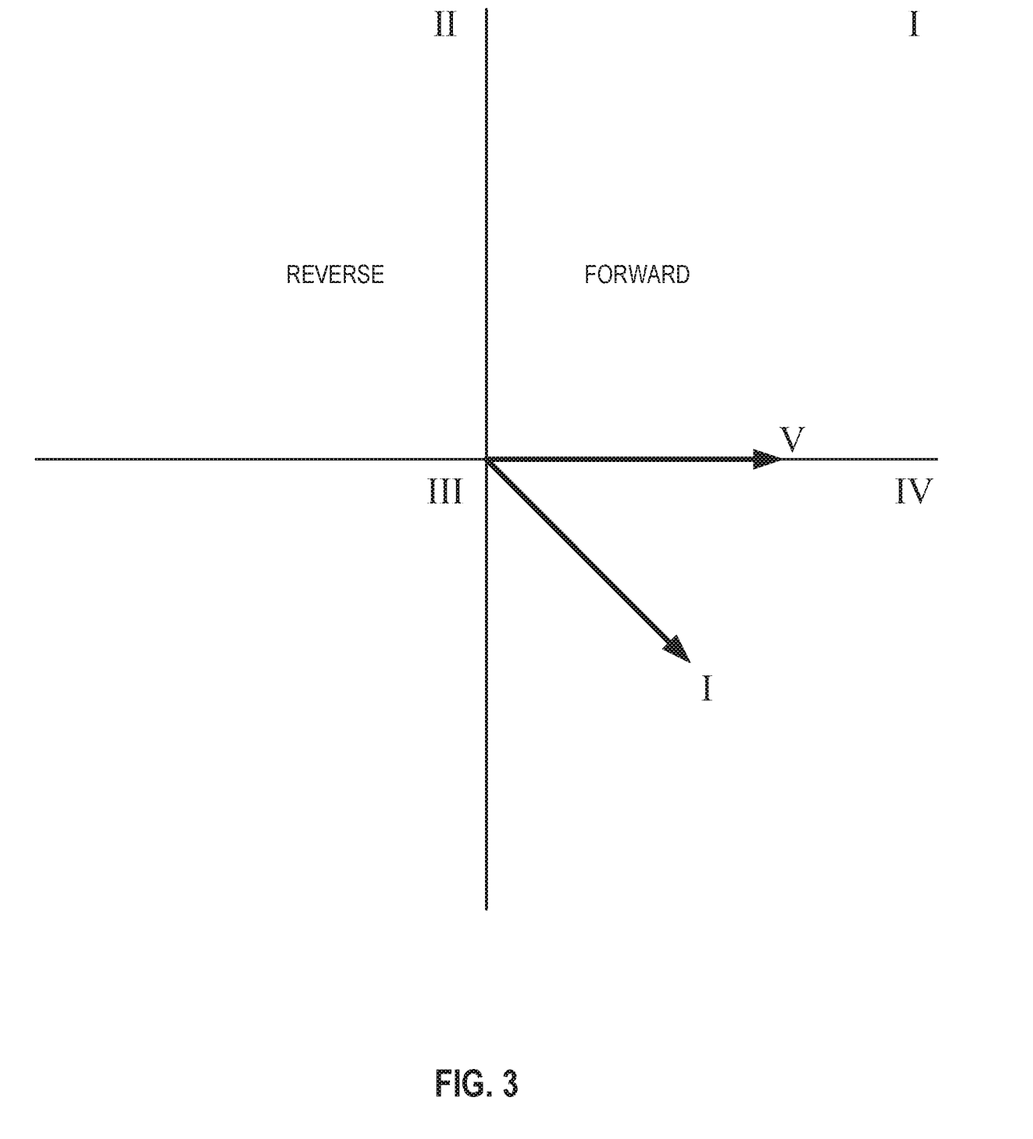
FIG. 3 is a graph of an example of measurements received by the CBC of FIG. 1 that may be used in a technique to determine power flow direction, in accordance with an embodiment.

FIG. 3 is a phasor diagram of current with respect to voltage illustrative of one technique to determine power flow direction, in accordance with an embodiment. The CBC 40 may determine that the power flow is in a first direction (e.g., forward direction) or the power flow is in a second direction (e.g., reverse direction) depending on the phase difference between the voltage and the current. For example, if the voltage and the current are within 90 degrees of each other, as indicated by quadrants I and IV, then the power flow may be in a forward direction (e.g., direction 54). If the voltage and current are greater than 90 degrees out of phase with each other, as indicated by quadrants II and III, then the power flow may be in a reverse direction (e.g., direction 56).

Returning to FIG. 2, the processor 100 may determine the direction of power flow based on the phase angle difference between voltage and current. For example, if the zero crossings of current and voltage of the power line indicate that the phase difference between current and voltage is within 90 degrees, the processor 100 may determine that power flow is in a forward direction (e.g., direction 54).

The CBC 40 may include, in the computer-readable medium 102, forward control instructions 130 that control the CBC 40 based on a first quantity when the power flow direction is in the first direction 54. Further, the computer-readable medium 102 may include reverse control instructions 132 that cause the CBC 40 to control connecting/disconnecting of the capacitor bank 42 based on a second quantity when the power flow direction is in the second direction. The first quantity may be determined using a first equation, and the second quantity may be determined using a second equation, different from the first equation. That is, the calculation used to determine the first control quantity and the second control quantity depend on the power flow direction.

Figure 4:
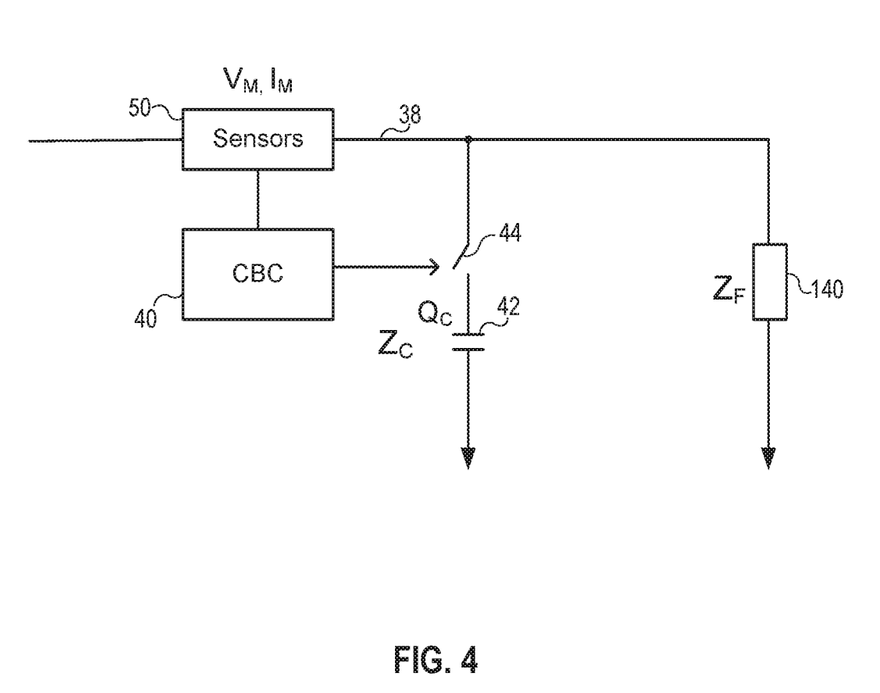
FIG. 4 is a circuit diagram of an equivalent circuit as seen by the CBC of FIG. 1 when the power flow direction is in a first direction, in accordance with an embodiment.

FIG. 4 is a circuit diagram of an equivalent circuit, as seen by the CBC 40 from the voltage and current measurements, of a phase of the electric power delivery system 20 of FIG. 1 in which the power flow direction is in the forward direction 54. The CBC 40 may obtain voltage and current measurements ($V_M$ and $I_M$) from the one or more sensors 50. The CBC 40 may determine a first quantity using a first equation when the power flow is in the first direction 54. The first quantity may be a control quantity associated with the illustrated equivalent circuit in which the measurements are obtained upstream of both the capacitor bank 42 and a forward direction load 140 $Z_F$, as illustrated. For instance, in FIG. 1, the sensors 50 are located upstream of the capacitor bank 42 and loads on the bus 28.

As mentioned above, the CBC 40 may perform volt-ampere reactive (VAR) control, current control, or power factor (PF) control to improve the power quality of the electric power delivery system 20. With respect to VAR control, the CBC 40 may determine a first VAR control quantity as being:

$$Q_{control} = Q_M \qquad \text{Eq. 1}$$

where $Q_M$ is the measured reactive power calculated using the voltage and current measurements $V_M$ and $I_M$. $Q_{control}$ may then be compared to a threshold VAR quantity to determine whether to open or close the switching device 44. With respect to current control, the CBC may use the measured current as a first current control quantity:

$$I_{control} = I_M \qquad \text{Eq. 2}$$

$I_{control}$ may then be compared to a threshold current quantity to determine whether to open or close the switching device 44.

With respect to PF control, the CBC 40 may determine a PF control quantity as being:

$$PF_{control} = \frac{P_M}{\sqrt{P_M^2 + Q_M^2}} \qquad \text{Eq. 3}$$

where $P_M$ is the measured active power using voltage and current measurements $V_M$ and $I_M$ and $Q_M$ is the measured reactive power using $V_M$ and $I_M$.

Figure 5:
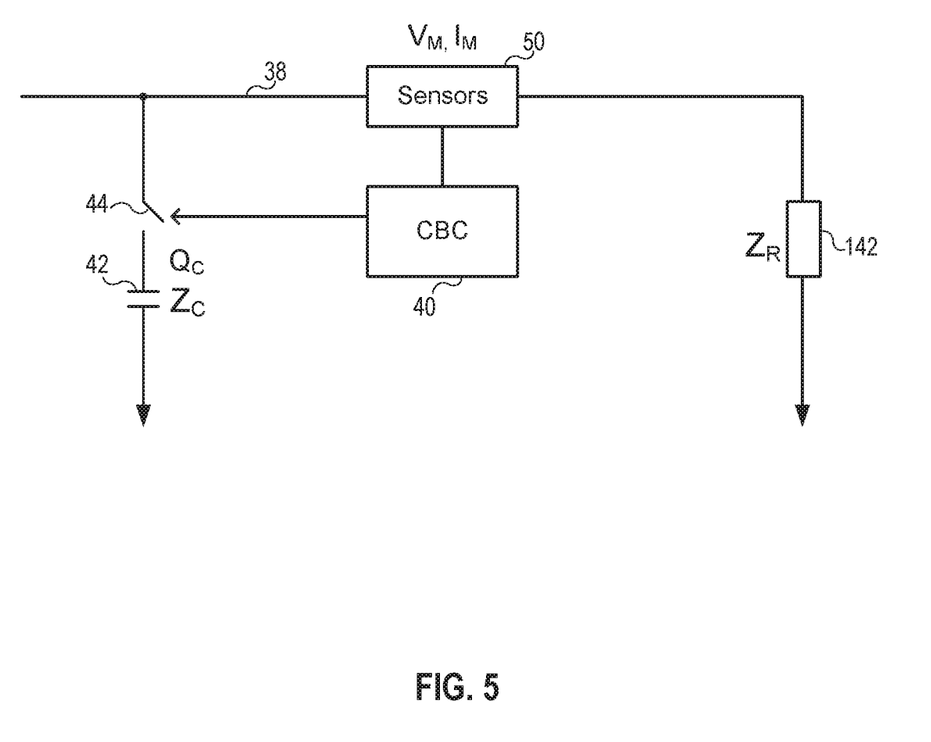
FIG. 5 is a circuit diagram of an equivalent circuit as seen by the CBC of FIG. 1 when the power flows in a second direction, opposite the first direction, in accordance with an embodiment.

FIG. 5 is a circuit diagram of an equivalent circuit, as seen by the CBC 40 from the voltage and current measurements, of a phase of the electric power delivery system 20 of FIG. 1 in which the power flow direction is in the reverse direction. The CBC 40 may determine a second quantity when the power flow is in the second direction 56 and the switch(es) of the capacitor bank are closed. The second quantity may be a control quantity associated with the illustrated equivalent circuit in which the measurements are obtained between a reverse direction load 142 $Z_R$ and the capacitor bank 42, as illustrated. For instance, when power is flowing in the reverse direction 56 in FIG. 1, the sensors 50 are located upstream of the loads on bus 26 and downstream of the capacitor bank 42.

With respect to VAR control, the CBC 40 may determine a reactive power of the capacitor bank ($Q_C$) to be:

$$Q_C = \frac{V^2}{X_C} \qquad \text{Eq. 4}$$

where $X_C$ is the reactance of the capacitor bank 42 determined from the capacitance of the capacitor bank 42. In some embodiments, the capacitance of the capacitor bank may be input via the input structures 104 during commissioning or may be determined automatically by opening and closing of the switching device 44 of the capacitor bank 42. The voltage of equation 4 may refer to the measured voltage from the sensors $V_M$ or may be an operating voltage from commissioning of the capacitor bank 42.

The CBC 40 may determine the second VAR quantity as:

$$Q_{Control} = Q_M - Q_C \qquad \text{Eq. 5}$$

where $Q_M$ is the measured reactive power using the voltage measurements $V_M$ and current measurements $I_M$ and $Q_C$ is the reactive power of the capacitor bank 42. When the switching device 44 is closed (i.e., the capacitor bank 42 is connected), $Q_C$ may be given by equation 4. When the switching device 44 is open (i.e., the capacitor bank 42 is disconnected), $Q_C$ may be zero.

With respect to current control, the CBC 40 may compute:

$$S_C = P_M + jQ_{Control} \qquad \text{Eq. 6}$$

where $S_C$ is the apparent power, which is a complex number with the real part as the measured power $P_M$ and with the imaginary part as the second VAR quantity of equation 5. The CBC 40 may compute the second current quantity as:

$$I_{Control} = \left(\frac{S_C}{V}\right)^* \qquad \text{Eq. 7}$$

where $S_C$ is the apparent power from equation 6, V is the measured voltage, and * represents taking the conjugate of the resulting value.

With respect to PF control, the CBC 40 may compute the second power factor quantity as:

$$PF = \frac{P_M}{\sqrt{P_M^2 + Q_{Control}^2}} \qquad \text{Eq. 8}$$

where $P_M$ is the measured power using the voltage and current measurements, and $Q_{control}$ is the second VAR quantity from equation 5. As each of equations 6-8 depend upon $Q_{control}$ and $Q_{control}$ varies based on whether the switching device 44 is open or closed, the second quantity may change depending on whether the capacitor bank 42 is connected or disconnected.

Figure 6:
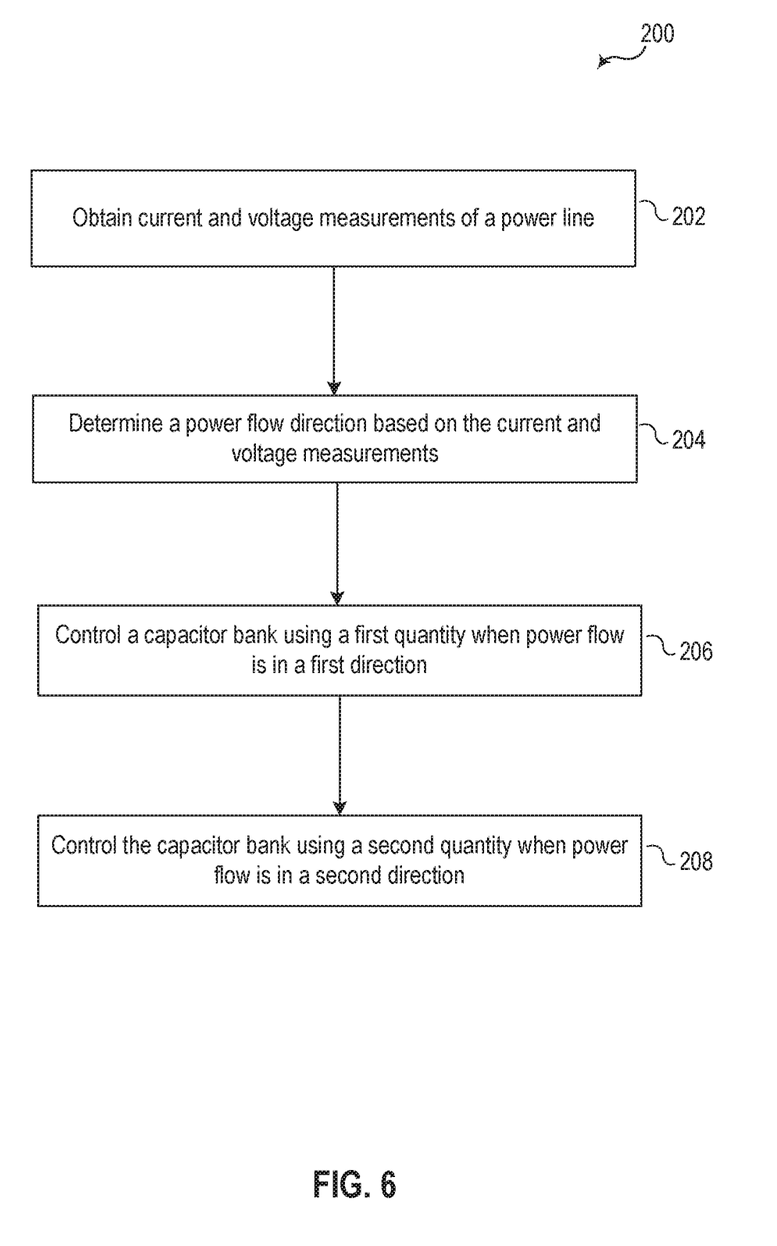
FIG. 6 is a flow diagram of a process that may be performed by the CBC of FIG. 1 to perform capacitor bank control using different quantities that depend on the power flow direction, in accordance with an embodiment.

FIG. 6 is a flow diagram of a process 200 that may be performed by the processor 100 of the CBC 40 to control the capacitor bank such that the control accounts for the power flow direction, thereby improving quality of the power delivered. The process 200 may be stored as instructions in the computer-readable medium 102 (e.g., code) to be executed by the processor 100. In some instances, the CBC 40 may be retrofitted from unidirectional control to include bidirectional control operations, for example, by adjusting the control scheme to use the first quantity when power flow is in the first direction and to use a second quantity when power flow is in the second direction.

The processor 100 may begin the process 200 by obtaining one or more current and voltage measurements of a power line (block 202). The processor 100 may determine a power flow direction based on the current and voltage measurements (block 204). As explained above with respect to FIG. 3, the CBC 40 may use the relationship between voltage and current to determine if the power flow direction is forward or reverse. For example, if the phase difference between the current and voltage is less than ninety degrees (positive or negative), then the processor 100 may determine the power flow direction as being in the forward direction 54. If the phase difference between the current and voltage is greater than 90 degrees (positive or negative), then the processor 100 may determine the power flow direction as being in the reverse direction 56.

As illustrated, the processor 100 may perform control operations using a first quantity while power flow is in a first direction (block 206). The first quantity may be determined using the equivalent circuit of FIG. 4 in which the power flow direction is in the forward direction. For example, the first quantity may be determined as the first VAR control quantity using equation 1, the first current control quantity using equation 2, or the first PF control quantity using equation 3. The CBC 40 may detect a change in the power flow direction.

The CBC 40 may then perform control operations on the capacitor bank using a second quantity when power flow is in a second direction (block 208). The second quantity may be a quantity that uses an equivalent circuit of FIG. 5 in which the power flow direction is in the reverse direction. The second quantity may be determined using the equivalent circuit of FIG. 5 in which the power flow direction is in the reverse direction. For example, the second quantity may be determined as the second VAR control quantity using equation 5, the second current control quantity using equations 6 and 7, or the second PF control quantity using equation 8.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A capacitor bank controller (CBC) configured to control a capacitor bank, comprising:
    one or more sensors configured to obtain one or more current measurements and one or more voltage measurements of a power line;
    memory; and
    a processor operatively coupled to the memory, wherein the processor is configured to execute instructions stored on the memory to cause the processor to:
        determine a power flow direction based at least in part on the one or more current measurements and the one or more voltage measurements;
        calculate a first quantity using a first equation when the power flow direction is in a first direction;
        control the capacitor bank using the first quantity when the power flow direction is in the first direction;
        detect that the power flow direction changed to a second direction, different than the first direction;
        calculate a second quantity using a second equation, different from the first equation, when the power flow direction is in the second direction; and
        control the capacitor bank using the second quantity when the power flow direction is in the second direction, wherein the second equation is different from the first equation to account for a different relationship between the one or more sensors of the CBC with respect to the capacitor bank on the power line;
    wherein the first equation corresponds to a first equivalent circuit of an electric power delivery system and the second equation corresponds to a second equivalent circuit of the electric power delivery system, different than the first equivalent circuit, wherein the first equivalent circuit is associated with a first relationship between the capacitor bank, the one or more sensors of the CBC, and a first load, and wherein the second equivalent circuit is associated with a second relationship between the capacitor bank, the one or more sensors, and a second load, at an opposite end of the power line with respect to the first load.

2. The CBC of claim 1, wherein the processor is configured to control the capacitor bank using the first quantity when the one or more sensors are upstream from the capacitor bank with respect to the power flow direction and to control the capacitor bank using the second quantity when the one or more sensors are downstream of the capacitor bank with respect to the power flow direction.

3. The CBC of claim 1, wherein the processor is configured to control the capacitor bank using the measurements from the same sensors when the power flow direction is in the first direction as when the power flow direction is in the second direction.

4. The CBC of claim 1, wherein the processor is configured to control the CBC independent of the reactive power of the capacitor bank when the power flow direction is in the first direction and to control the CBC based at least in part on the reactive power of the capacitor bank when the power flow direction is in the second direction.

5. The CBC of claim 1, wherein the processor is configured to send one or more signals to at least one switching device of the capacitor bank to connect or disconnect the capacitor bank based on whether the first quantity exceeds a threshold to control the capacitor bank when the power flow direction is in the first direction.

6. The CBC of claim 5, wherein the processor is configured to send the one or more signals to the at least one switching device of the capacitor bank to connect or disconnect the capacitor bank based on whether the second quantity exceeds the threshold to control the capacitor bank when the power flow direction is in the second direction.

7. The CBC of claim 1, wherein the processor is configured to determine the power flow direction by comparing the phase difference between the one or more current measurements and the one or more voltage measurements.

8. A tangible, non-transitory, computer-readable medium comprising instructions that, when executed by a processor of a capacitor bank controller (CBC), cause the processor to:
    determine a power flow direction based at least in part on one or more current measurements and one or more voltage measurements;
    calculate a first quantity using a first equation when the power flow direction is in a first direction
    control a capacitor bank using the first quantity when the power flow direction is in the first direction;
    detect that the power flow direction changed to a second direction, different than the first direction;
    calculate a second quantity using a second equation, different from the first equation, when the power flow direction is in the second direction; and
    control the capacitor bank using the second quantity when the power flow direction is in the second direction, wherein the second equation is different from the first equation to account for a different relationship between one or more sensors of the CBC with respect to the capacitor bank on the power line
    wherein the first equation corresponds to a first equivalent circuit of an electric power delivery system and the second equation corresponds to a second equivalent circuit of the electric power delivery system, different than the first equivalent circuit, wherein the first equivalent circuit is associated with a first relationship between the capacitor bank, the one or more sensors of the CBC, and a first load, and wherein the second equivalent circuit is associated with a second relationship between the capacitor bank, the one or more sensors, and a second load, at an opposite end of the power line with respect to the first load.

9. The computer-readable medium of claim 8, comprising instructions that, when executed by the processor, cause the processor to perform current control using a conjugate of apparent power and a voltage from the one or more voltage measurements.

10. The computer-readable medium of claim 8, comprising instructions that, when executed by the processor, cause the processor to:

control the capacitor bank using a first VAR control quantity when the power flow direction is in the first power flow direction, wherein the first VAR control quantity is a measured reactive power from the one or more current measurements and the one or more voltage measurements; and control the capacitor bank using a second VAR control quantity when the power flow direction is in the second power flow direction, wherein the second VAR control quantity is determined as the difference between the measured reactive power and the capacitor bank.

11. The computer-readable medium of claim 8, comprising instructions that, when executed by the processor, cause the processor to:

control the capacitor bank using a first VAR control quantity when the power flow direction is in the first power flow direction; and control the capacitor bank using a second VAR control quantity when the power flow direction is in the second power flow direction, wherein the second VAR control quantity comprises a difference between the first VAR control quantity and a capacitor bank quantity.

12. The computer-readable medium of claim 8, comprising instructions that, when executed by the processor, cause the processor to:

control the capacitor bank using the one or more current measurements as a first current control quantity when the power flow direction is in the first power flow direction; and control the capacitor bank using a second current control quantity based on an apparent power calculated from the one or more current measurements and one or more voltage measurements.

13. The computer-readable medium of claim 8, comprising instructions that, when executed by the processor, cause the processor to:

control the capacitor bank using a first power factor control quantity when the power flow direction is in the first power flow direction; and control the capacitor bank using a second power factor control quantity when the power flow direction is in the second power flow direction.

14. The computer-readable medium of claim 8, wherein the first power factor control quantity is determined using the first equation and the second power factor control quantity is determined using the second equation.

15. The computer-readable medium of claim 8, wherein the first power factor control quantity is determined using the measured reactive power from the voltage and current measurements, and wherein the second power factor control quantity is determined using a control reactive power quantity from the difference between the measured reactive power and the reactive power of the capacitor bank.

16. A method, comprising:

determine, via a capacitor bank controller (CBC), a power flow direction based at least in part on one or more current measurements and the one or more voltage measurements;

calculate a first quantity using a first equation when the power flow direction is in the first direction;

control a capacitor bank using the first quantity when the power flow direction is in a first direction;

detect that the power flow direction changed to a second direction, different than the first direction;

calculate a second quantity using a second equation, different from the first equation, when the power flow direction is in the second direction; and control the capacitor bank using the second quantity when the power flow direction is in a second direction, wherein the second equation is different from the first equation to account for a different relationship between one or more sensors of the CBC with respect to the capacitor bank on the power line;

wherein the first equation corresponds to a first equivalent circuit of an electric power delivery system and the second equation corresponds to a second equivalent circuit of the electric power delivery system, different than the first equivalent circuit, wherein the first equivalent circuit is associated with a first relationship between the capacitor bank, the one or more sensors of the CBC, and a first load, and wherein the second equivalent circuit is associated with a second relationship between the capacitor bank, the one or more sensors, and a second load, at an opposite end of the power line with respect to the first load.

17. The method of claim 16, wherein the first equivalent circuit comprises one or more sensors of the CBC being connected upstream of the capacitor bank and the first load, and wherein the second equivalent circuit comprises the one or more sensors of the CBC being connected between the capacitor bank and the second load.

18. The method of claim 16, wherein the second quantity is based at least in part on whether a switch is open or closed due to the capacitance of the capacitor bank being connected or disconnected.

* * * * *